United States Patent
Nakanishi et al.

[11] Patent Number: 5,259,985
[45] Date of Patent: Nov. 9, 1993

[54] CALCIUM CARBONATE SCALE INHIBITOR HAVING ORGANOPHOSPHONATE, WATER SOLUBLE ACRYLIC OR MALEIC COPOLYMER AND CITRIC ACID

[75] Inventors: Keisho Nakanishi, Nara; Masatsune Okuma, Kyoto; Sakae Katayama, deceased, late of Nishinomiya, all of Japan, by Hirohiko Katayama, executor

[73] Assignee: Katayama Chemical, Incorporated, Osaka, Japan

[21] Appl. No.: 749,684

[22] Filed: Aug. 26, 1991

[30] Foreign Application Priority Data

Sep. 3, 1990 [JP] Japan .................................. 2-233486

[51] Int. Cl.⁵ .............................. C02F 5/10; C02F 1/00
[52] U.S. Cl. ..................................... 252/180; 252/175; 252/181; 210/699; 210/700
[58] Field of Search ................. 252/180, 181, 175; 210/699, 700, 698

[56] References Cited

U.S. PATENT DOCUMENTS

| | | | |
|---|---|---|---|
| 4,246,030 | 1/1981 | Lipinski | 251/181 |
| 4,545,920 | 10/1985 | Lorene et al. | 252/180 |
| 4,661,261 | 4/1987 | Chambers | 252/180 |
| 4,713,195 | 12/1987 | Schneider | 252/180 |
| 4,798,675 | 1/1989 | Lipinski et al. | 252/180 |
| 4,931,188 | 6/1990 | Chen | 210/698 |
| 4,952,327 | 8/1990 | Amjad et al. | 252/180 |

*Primary Examiner*—Jacqueline V. Howard
*Assistant Examiner*—J. Silbermann
*Attorney, Agent, or Firm*—Cohen, Pontani, Lieberman, Pavane

[57] ABSTRACT

A scale inhibitor for a calcium-type scale, which includes ingredients of:
(a) an organophosphonic acid or its salt having an scale inhibiting activity;
(b) a water-soluble acrylic acid-type or maleic acid-type polymer constituted by at least two kinds of monomer unit composed of a vinyl monomer having a carboxyl group or another polar group; and
(c) citric acid or its salt.

6 Claims, 2 Drawing Sheets

CALCIUM CARBONATE SCALE INHIBITOR HAVING ORGANOPHOSPHONATE, WATER SOLUBLE ACRYLIC OR MALEIC COPOLYMER AND CITRIC ACID

BACKGROUND OF THE INVENTION

1. Field of the Invention

This invention relates to a scale inhibitor for calcium-type scales, and more particularly to a scale inhibitor useful for preventing the occurrence of calcium carbonate-type scales in various aqueous systems having a calcium hardness.

2. Prior Art

In various aqueous systems for industrial use, especially in such systems for boilers or cooling units, formed is a calcium-type scale of which main component is calcium carbonate originated from a hardness-causing component and carbonate ion present in water. Such a scale is deposited over heat transfer surfaces of the above aqueous systems thereby lowering the heat transfer efficiency thereof. Accordingly, it is desired to prevent or inhibit the occurrence of the scale.

In view of the above, a formulation known as a scale inhibitor has conventionally been used as additive to the aqueous systems for preventing or inhibiting the occurrence of the calcium-type scale. Specifically, there have been proposed for a relatively long time various formulations such as of polyacrylic acid-type copolymers, organophosphonic acids, organic chelating agents or the like.

Recently, there has also been proposed to use a combination of a certain kind of organophosphonic acid and a specific water-soluble organic copolymer having a carboxyl group and a sulfonate group in view of its scale inhibiting efficiency (Japanese Examined Patent Publication No. 41400/1989).

In industrial aqueous systems like those for cooling units, water is recently more and more recycled allowing for efficient utilization thereof. This is meant by the utilization of highly concentrated water. In such highly concentrated water the calcium hardness (calculated as calcium carbonate) becomes extremely high and frequently exceeds 300 ppm.

In the case of using the foregoing conventional scale inhibitor for the highly concentrated water, the scale inhibiting effect thereof may be insufficient. In particular it is difficult to effectively inhibit the occurrence of scale in a concentrated aqueous system having the calcium hardness of over 300 ppm with the use of usual usage of the conventional inhibitor on the order of several ppm to several tens ppm.

In another aspect, there is a tendency to increase the heat flux at the heart transfer portion for improving productivity of boilers or apparatus used in cooling units. With the increased heat flux, the amount of calcium carbonate-type scale occurred extremely increases, resulting in frequent scale problems. In the aqueous system with the increased heat flux (for example, more than 300,000 Kcal/m².hr), it has been difficult for the conventional scale inhibitor to prevent scale problems even if low calcium hardness water is used.

SUMMARY OF THE INVENTION

The present invention is accomplished under the foregoing situations, and an object thereof is to provide a scale inhibitor capable of exhibiting an excellent scale inhibiting effect even in a highly concentrated aqueous system having a high hardness or an aqueous system having a heat transfer portion of the increased heat flux.

Thus, the present invention provides a scale inhibitor for a calcium-type scale, which comprises ingredients of:

(a) an organophosphonic acid or its salt possessing a scale inhibiting activity;
(b) a water-soluble acrylic acid-type or maleic acid-type copolymer constituted by at least two kinds of monomer unit composed of a vinyl monomer having a carboxyl group or another polar group; and
(c) citric acid or its salt.

The present invention is based on a finding such that adding citric acid to a combination of an organophosphonic acid-type scale inhibitor and a water-soluble acrylic acid-type or maleic acid-type copolymer enables to remarkably improve the scale inhibiting effect thereof, which effect is stably exhibited even under severe conditions such as high hardness of water and increased heat flux in an aqueous system as described above. Such a finding can be said to be a surprising fact because citric acid per se has no scale inhibiting action.

DETAILED DESCRIPTION OF THE PREFERRED EMBODIMENTS

Figure 1:
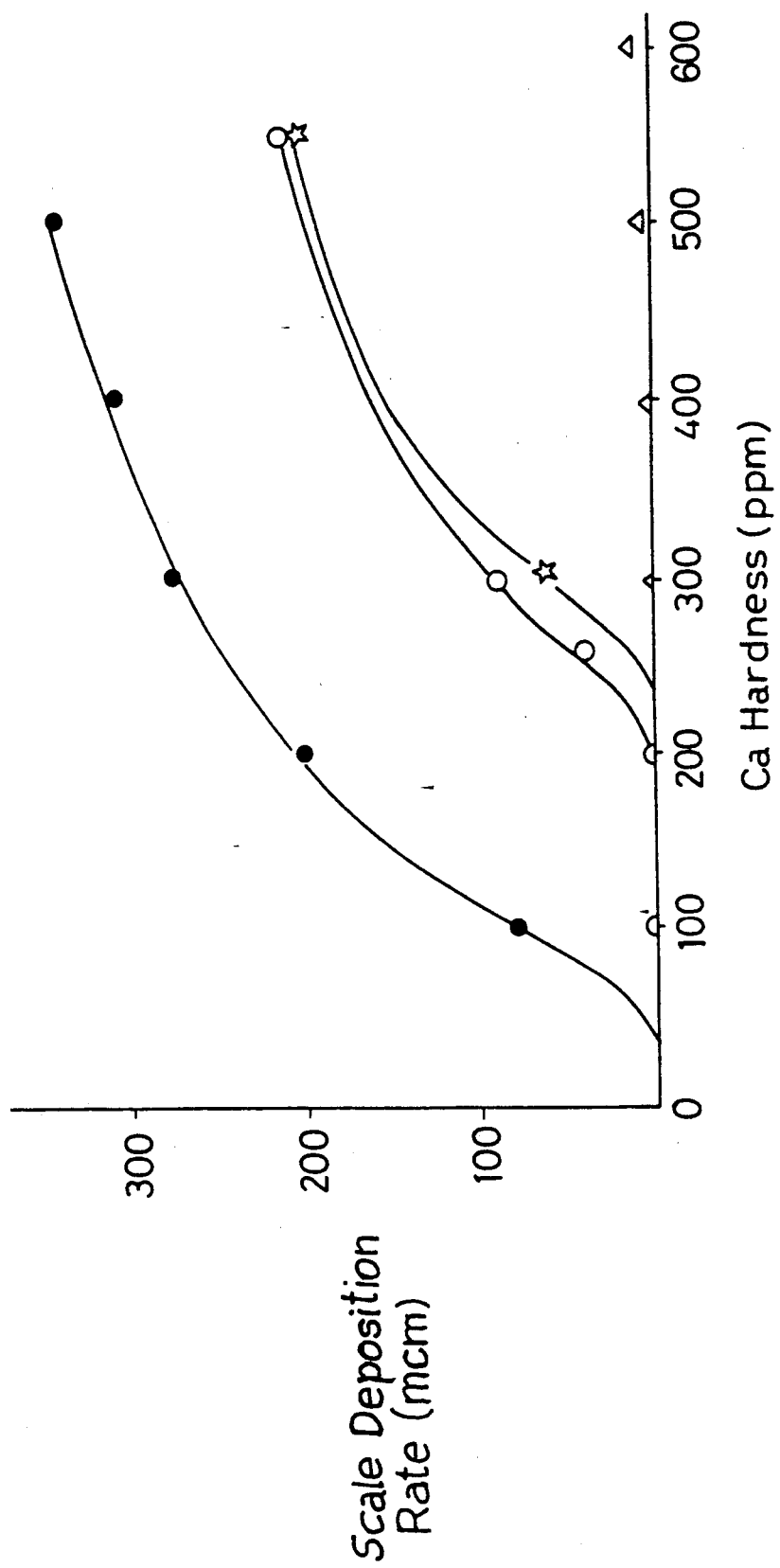
FIGS. 1 and 2 are each a graph showing an scale inhibiting effect of the scale inhibitor of the invention in comparing with that of a comparative example.

The organophosphonic acid or its salt employed in the present invention may be any one possessing a scale inhibiting activity which is known in the art.

Examples of the organophosphonic acids include ethylphosphonic acid, isopropylphosphonic acid, butylphosphonic acid, methylenediphosphonic acid, 1-hydroxyethylidene-1,1-diphosphonic acid, 1,1-aminoethanediphosphonic acid, 1,1-hydroxypropanediphosphonic acid, 1,1-hydroxydibutanediphosphonic acid, 1,1-aminobutanediphosphonic acid, aminotrimethylenephosphonic acid, aminotriethylenephosphonic acid, ethylenediaminetetramethylphosphonic acid, hexamethylenediaminetetramethylphosphonic acid, diethylenetriaminepentamethylphosphonic acid, 2-phosphonoacetic acid, 2-phosphonopropionic acid, 2-phosphonosuccinic acid, and 2-phosphonobutane-1,2,4-tricarboxylic acid. Among these, particularly preferable are 2-phosphonobutane-1,2,4-tricarboxylic acid, 1-hydroxyethylidene-1,1-diphosphonic acid and aminotrimethylenephosphonic acid. As the salt of the above organophosphonic acid, suitable are an alkaline metal salt such as sodium salt and potassium salt, an ammonium salt and the like.

The water-soluble acrylic acid-type or maleic acid-type copolymer to be used in the invention is a copolymer constituted by at least two kinds of monomer units composed of a vinyl monomer having a carboxyl group or another polar group. The vinyl monomer having a carboxyl group may be a compound represented by the formula (I):

where $R_1$ represents a hydrogen atom or a methyl group; $R_2$ represents a hydrogen atom, a methyl group or carboxyl group; in the case where $R_2$ is a carboxyl group, $R_2$ may be bonded to the adjacent carboxyl group to form an anhydrous ring.

Specific examples of such monomers include acrylic acid, methacrylic acid, maleic acid, maleic anhydride, fumaric acid and the like. These may be in the form of salt like a sodium salt.

On the other side, the monomer having another polar group may be a compound represented by the formula (II):

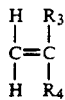

where $R_3$ represents a hydrogen atom or a methyl group; $R_4$ represents $-COOR_5SO_3H$, $-COOR_5OH$, $-CONHR_5SO_3H$, $-CONHR_5OH$, $-R_5SO_3H$,

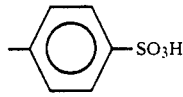

or $-R_5O(R_6O)_nH$ (where $R_5$ represents a $C_{1-6}$ alkylene group; $R_6$ represents a $C_{1-3}$ alkylene group; n is an integer selected from 0 to 100). Such a monomer may be in the form of salt, for example, a sodium salt.

Examples of the monomer of the formula (II) include sulfoethyl acrylate, methallylsulfonic acid, 2-acrylamido-2-methylpropanesulfonic acid, polyethyleneglycol monoallyl ether, styrenesulfonic acid, 2-hydroxyethyl acrylate, N-methylolacrylamide and the like.

The water-soluble acrylic acid-type or maleic acid-type copolymer (b) to be used in the invention comprises a copolymer constituted by at least two kinds of the monomer (I) or by at least a combination of the monomer (I) and the monomer (II).

Examples of such a copolymer include a (meth)acrylic acid/sulfoethyl acrylate copolymer, (meth)acrylic acid/methallylsulfonic acid copolymer, (meth)acrylic acid/2-acrylamido-2-methylpropanesulfonic acid copolymer, (meth)acrylic acid/polyethyleneglycol monoallyl ether copolymer, acrylic acid/methacrylic acid copolymer, maleic acid/styrenesulfonic acid copolymer, acrylic acid/2-hydroxyethyl acrylate copolymer, methacrylic acid/N-methylolacrylamide copolymer and a like copolymer. The molecular weight of the copolymer is not specifically limited, but suitably about 500-20,000. The copolymerization ratio should be adjusted so that the copolymer may contain at least more than 30 mol % of the monomer unit having a carboxyl group.

The salt of citric acid as the ingredient (c) of the invention is suitably an alkaline salt such as of sodium, potassium, ammonium and the like.

The scale inhibitor of the invention is usually prepared as an aqueous formulation containing the ingredients of the organophosphonic acid (a), the water-soluble acrylic acid-type or maleic acid-type copolymer (b) and citric acid (c), but may be in the form of powder. The scale inhibitor of the invention may, of course, contain other known additives, for example, other scale inhibiting agents, corrosion inhibiting agents and slime inhibiting agents, unless the effect of the invention is impeded.

Regarding the blending ratio (by weight) of the ingredients (a), (b) and (c), the ingredient (b) is preferably 0.4-20 relative to the ingredient (a) as 1, more preferably 1.0-10. It is preferred to adjust the ratio of the ingredient (c) to be 0.3-3.0 relative to the total amount of the ingredients (a) and (b) as 1 in view of synergistic effect thereof, more preferably 0.5-2.0. Taking both synergistic effect and economic factor into consideration, the blending ratio of the ingredient (b) to the ingredient (a) is most preferably 1.0-3.0:1.

In the case where the ratio of (b) to (a) is less than 0.4:1 or more than 20:1, or where the ratio of (c) to the total amount of (a) and (b) is less than 0.3:1 or more than 3:1, the synergistic effect is not exhibited thereby causing unsatisfactory scale inhibiting effect.

Instead of using citric acid or its salt as the ingredient (c), even if another hydroxycarboxylic acid such as tartaric acid, gluconic acid or malic acid, or its salt is used, satisfactory scale-inhibiting effect cannot be obtained.

The amount of the scale inhibitor of the invention to be used is not specifically limited, but is suitably selected from the range of 5-100 ppm as the total amount of active ingredients. For instance, use of about 20-60 ppm in the aqueous system having a Ca hardness of over 300 ppm (usually highly concentrated water) can usually exhibit a satisfactory scale-inhibiting effect. Further, use of about 5-50 ppm in the aqueous system having a heat flux of over 300,000 Kcal/m$^2$.hr can usually attain a desired scale-inhibiting effect.

The scale inhibitor of the invention is particularly useful for inhibiting calcium-type scales in highly concentrated aqueous systems having a Ca hardness of over 300 ppm for cooling units, heat exchangers in aqueous systems having a heat flux of over 300,000 Kcal/m$^2$.hr, digesters in paper or pulp plants or the like.

EXAMPLE

EXAMPLE 1

A scale inhibitor in accordance with the invention was prepared using as the ingredient (a), 2-phosphonobutane-1,2,4-tricarboxylic acid (abbreviated as PBTC hereunder), 1-hydroxyethylidene-1,1-diphosphonic acid (abbreviated as HEDP hereunder) or aminotrimethylenephosphonic acid (abbreviated as AMP hereunder), as the ingredient (b), a water-soluble acrylic or maleic acid type copolymer as listed in Table 1, and as the ingredient (c), citric acid or sodium citrate. These ingredients were blended at a ratio as seen in Table 3 and dissolved in pure water to obtain Examples of the invention as aqueous formulations (solid content: 30%).

For comparison, Comparative examples were prepared by blending the predetermined ingredients also shown in Table 3 at respective ratios and dissolved in pure water to form aqueous formulations.

TABLE 1

| Copolymer No. | Copolymer | Copolymerization ratio | Average molecular weight |
|---|---|---|---|
| ① | acrylic acid/ sulfoethyl acrylate | 80/20 | about 4,000 |
| ② | acrylic acid/ methallylsulfonic acid | 70/30 | about 10,000 |
| ③ | acrylic acid/ | 50/50 | about 5,000 |

TABLE 1-continued

| Co-polymer No. | Copolymer | Copolymerization ratio | Average molecular weight |
|---|---|---|---|
| ④ | 2-acrylamido-2-methylpropanesulfonic acid acrylic acid/ polyethyleneglycol monoallyl ether | 50/50 | about 4,000 |
| ⑤ | acrylic acid/ methacrylic acid | 50/50 | about 5,000 |
| ⑥ | maleic acid/ styrenesulfonic acid | 50/50 | about 5,000 |
| ⑦ | acrylic acid/ 2-hydroxyethyl acrylate | 50/50 | about 5,000 |
| ⑧ | methacrylic acid/ N-methylolacrylamide | 50/50 | about 10,000 |

The scale inhibiting effect against calcium-carbonate scale was evaluated for each of the Examples and Comparative examples by conducting a scale deposition test using a double-pipe exchanger of which inner pipe functioned as heat transfer surface. Each example or comparative example was added in a predetermined amount to the aqueous system of the exchanger.

Two types of water were used in the test and which are detailed in Table 2.

TABLE 2

| Item | Water type A | Water type B |
|---|---|---|
| pH | 9.0 | 9.0 |
| M-alkalinity* | 500 ppm | 630 ppm |
| Ca-hardness* | 300 ppm | 550 ppm |
| Cl ion | 100 ppm | 120 ppm |
| $SO_4$ ion | 100 ppm | 120 ppm |

*calculated as $CaCO_3$

The test was conducted under the following conditions:

Temperature of the test water: 40° C., Heat flux: 30,000 Kcal/$m^2$.hr,

Flow rate of the test water: 0.5 m/s, Test period: 120 hr.

The result of the test is shown in Table 3. In this table, mcm is meant by a scale deposition rate (mg/$cm^2$.month).

TABLE 3

| No. | Phosphonic acid (a) | Copolymer (b) [relative to (a)] | Citric acid (c) [relative to (a) + (b)] | Dose | Effect (mcm) Water type A | Effect (mcm) Water type B |
|---|---|---|---|---|---|---|
| Example | | | | | | |
| 1 | PBTC 7% (1) | No. ① 8% (1.14) | Sodium Salt 15% (1.00) | 100 ppm 150 ppm | 2.5 1.1 | 5.8 4.8 |
| 2 | PBTC 5% (1) | No. ② 9% (1.80) | Sodium Salt 16% (1.14) | 100 ppm 150 ppm | 4.0 2.1 | 8.9 5.2 |
| 3 | HEDP 4% (1) | No. ③ 6% (1.50) | Sodium Salt 20% (2.00) | 100 ppm 150 ppm | 5.0 3.8 | 6.8 5.1 |
| 4 | PBTC 6% (1) | No. ④ 10% (1.67) | 14% (0.88) | 150 ppm | 0.8 | 4.0 |
| 5 | HEDP 5% (1) | No. ⑤ 8% (1.60) | 17% (1.31) | 150 ppm | 2.8 | 3.2 |
| 6 | PBTC 8% (1) | No. ⑦ 4% (0.5) | 18% (1.50) | 150 ppm | 6.5 | 9.1 |
| 7 | HEDP 3.6% (1) | No. ② 18% (5.00) | Sodium Salt 8.4% (0.39) | 150 ppm | 7.8 | 12.2 |
| 8 | PBTC 6% (1) | No. ⑥ 16.5% (2.75) | 7.5% (0.33) | 150 ppm | 6.3 | 10.8 |
| 9 | HEDP 3.5% (1) | No. ① 4% (1.14) | 22.5% (3.00) | 150 ppm | 8.2 | 13.5 |
| 10 | PBTC 12% (1) | No. ③ 5% (0.4) | 13% (0.76) | 150 ppm | 7.9 | 10.0 |
| 11 | PBTC 2% (1) | No. ④ 13% (6.5) | 15% (1.00) | 150 ppm | 5.3 | 11.2 |
| 12 | HEDP 1% (1) | No. ③ 9% (9) | 20% (2.00) | 150 ppm | 3.9 | 6.4 |
| 13 | HEDP 1% (1) | No. ⑦ 14% (14) | 15% (1.00) | 150 ppm | 4.3 | 7.9 |
| 14 | HEDP 1.5% (1) | No. ① 11.5% (7.7) | 17% (1.13) | 150 ppm | 4.1 | 6.5 |
| 15 | PBTC 0.8% (1) | No. ④ 16% (20) | 13.2% (0.78) | 150 ppm | 4.6 | 8.1 |
| 16 | AMP 7% (1) | No. ② 3% (0.43) | 20% (2.00) | 150 ppm | 8.5 | 11.2 |
| 17 | AMP 6% (1) | No. ⑥ 6% (1.0) | 18% (1.50) | 150 ppm | 8.3 | 13.4 |
| 18 | AMP 6% (1) | No. ① 9% (1.5) | 15% (1.0) | 150 ppm | 2.9 | 4.8 |
| 19 | AMP 7% (1) | No. ⑦ 13% (1.86) | 10% (0.5) | 150 ppm | 3.2 | 5.6 |
| 20 | AMP 3% (1) | No. ③ 12% (4.0) | 15% (1.0) | 150 ppm | 5.8 | 8.6 |
| 21 | AMP 1% (1) | No. ② 9% (9.0) | 20% (2.0) | 150 ppm | 4.0 | 6.1 |
| 22 | AMP 1% (1) | No. ① 14% (14.0) | 15% (1.0) | 150 ppm | 4.5 | 7.7 |
| 23 | AMP 0.8% (1) | No. ⑤ 16% (20.0) | 13.2% (0.78) | 150 ppm | 4.7 | 8.0 |
| Comparative example | | | | | | |
| 1 | PBTC 30% | — | — | 100 ppm 150 ppm | 75 47 | 228 143 |
| 2 | HEDP 30% | — | — | 100 ppm | 90 | 230 |

TABLE 3-continued

| No. | Phosphonic acid (a) | Copolymer (b) [relative to (a)] | Citric acid (c) [relative to (a) + (b)] | Dose | Effect (mcm) Water type A | Effect (mcm) Water type B |
|---|---|---|---|---|---|---|
|  |  |  |  | 150 ppm | 49 | 152 |
| 3 | AMP 30% | — | — | 100 ppm | 95 | 242 |
|  |  |  |  | 150 ppm | 51 | 156 |
| 4 | — | — | 20% | 150 ppm | 285 | 320 |
| 5 | — | No. ① 30% | — | 150 ppm | 152 | 280 |
| 6 | — | No. ③ 30% | — | 152 ppm | 131 | 261 |
| 7 | — | No. ⑤ 30% | — | 150 ppm | 169 | 320 |
| 8 | PBTC 6% | — | 24% | 150 ppm | 118 | 225 |
| 9 | PBTC 6% | No. ⑤ 24% | — | 150 ppm | 108 | 262 |
| 10 | PBTC 6% | No. ① 24% | — | 150 ppm | 99 | 219 |
| 11 | HEDP 8% (1) | No. ② 17% (1.67) | Sodium Salt 5% (0.2) | 150 ppm | 79 | 185 |
| 12 | PBTC 12% (1) | No. ⑥ 3% (0.25) | 15% (1.00) | 150 ppm | 68 | 130 |
| 13 | HEDP 2% (1) | No. ⑦ 5% (2.5) | 23% (3.29) | 150 ppm | 51 | 89 |
| 14 | AMP 15% (1) | No. ① 4% (0.27) | 11% (0.58) | 150 ppm | 69 | 135 |
| 15 | PBTC 6% (1) | ① 10% (1.17) | Tartaric acid 14% (0.88) | 150 ppm | 101 | 295 |
| 16 | PBTC 6% (1) | ① 10% (1.67) | Gluconic acid 14% (0.88) | 150 ppm | 105 | 287 |
| 17 | PBTC 6% (1) | ① 10% (1.67) | Malic acid 14% (0.88) | 150 ppm | 98 | 288 |

PBTC: 2-phosphonobutane-1,2,4-tricarboxylic acid
HEDP: 1-hydroxyethylidene-1,1-diphosphonic acid
AMP: aminotrimethylenephosphonic acid As is apparent from Table 3, the scale inhibitor of the invention exhibited an excellent scale effect. Particularly, since Comparative Examples No. 14-16 in which hydroxycarboxylic acids other than citric acid were used instead of citric acid did not exhibit a satisfactory inhibiting effect, the present invention using citric acid should be considered to be selective and have a superior effect.

EXAMPLE 2

A scale deposition test was conducted using Example No. 4 appeared in Table 3 under the same conditions as in Example 1 except the type of water. The water used in this test is detailed in the following Table 4 but of which Ca hardness was varied stepwise as 100 200 300 400 500 600.

TABLE 4

| pH | 8.3 |
|---|---|
| M-alkalinity* | 600 ppm |
| Cl ion | 100 ppm |
| SO₄ ion | 100 ppm |

*calculated as CaCO₃

The result of the test is shown in FIG. 1 in which represented as "●" is data of the case using no scale inhibitor, as "○", data of the case using only HEDP (30 ppm as solid), as "☆", data of the case using only PBTC (30 ppm as solid), and as "△", data of the case using Example No. 4 of the invention (30 ppm as solid).

As can be understood from FIG. 1, the comparative examples, i.e., HEDP and PBTC exhibited insufficient scale-inhibiting effect in the case where the Ca harness of the test water exceeded 200 ppm. Furthermore, such an effect was reduced by half when the Ca hardness was over 300 ppm. In contrast, the scale inhibitor of the invention maintained its scale-inhibiting effect against a calcium-type scale even in the water having a Ca hardness of over 300 ppm.

EXAMPLE 3

A scale inhibitor in accordance with the invention was prepared in the same manner as Example 1. The ingredients (a), (b) and (c) are blended at different ratio than in Example 1 and dissolved in pure water to obtain aqueous formulations as Examples appeared in Table 6.

Another scale deposition test was conducted for each of the Examples by the use of a water circulation device equipped with a heater and having a high heat transfer surface.

The type of water used in the aqueous system of the water circulation device is detailed in Table 5.

TABLE 5

| pH | 8.3 |
|---|---|
| M-alkalinity | 300 ppm |
| Total hardness | 160 ppm |
| Ca hardness | 100 ppm |

The test was conducted under the following conditions:
Temperature of the water: 50° C.
Flow rate of the water: 0.5 m/sec
Test period: 120 hrs
Heat flux: 500,000 Kcal/m²·hr The result of the test is shown in Table 6 together with the test result of Comparative Examples.

TABLE 6

| Example No. | Phosphonic acid (a) | Copolymer (b) [relative to (a)] | Citric acid (c) [relative to (a) + (b)] | Dose | Effect (mcm) |
|---|---|---|---|---|---|
| 24 | HEDP 2% (1) | No. ④ 8% (4.00) | 10% (1.00) | 50 ppm | 1.00 |

TABLE 6-continued

|  | Phosphonic acid (a) | Copolymer (b) [relative to (a)] | Citric acid (c) [relative to (a) + (b)] | Dose | Effect (mcm) |
|---|---|---|---|---|---|
| 25 | HEDP 3% (1) | No. ④ 7% (2.33) | 10% (1.00) | 50 ppm | 0.81 |
| 26 | HEDP 4% (1) | No. ④ 6% (1.5) | 10% (1.00) | 50 ppm | 0.53 |
| 27 | HEDP 5% (1) | No. ④ 5% (1) | 10% (1.00) | 50 ppm | 0.38 |
| 28 | HEDP 6% (1) | No. ④ 4% (0.67) | 10% (1.00) | 50 ppm | 0.86 |
| 29 | HEDP 7% (1) | No. ④ 3% (0.43) | 10% (1.00) | 50 ppm | 1.01 |
| 30 | PBTC 10% (1) | No. ① 4% (0.4) | 6% (0.43) | 50 ppm | 1.89 |
| 31 | PBTC 10% (1) | No. ② 5% (0.5) | 5% (0.33) | 50 ppm | 0.68 |
| 32 | HEDP 2% (1) | No. ③ 10% (5) | 8% (0.67) | 50 ppm | 1.21 |
| 33 | HEDP 2% (1) | No. ⑥ 6% (3) | 12% (1.5) | 50 ppm | 1.52 |
| 34 | PBTC 10% (1) | No. ⑧ 5% (0.5) | 5% (0.33) | 50 ppm | 0.71 |
| 35 | AMP 7% (1) | No. ① 8% (0.88) | 15% (1.00) | 50 ppm | 0.72 |
| 36 | AMP 8% (1) | No. ① 7% (1.14) | 15% (1.00) | 50 ppm | 0.81 |
| 37 | AMP 7.5% (1) | No. ② 12.5% (1.67) | 10% (0.50) | 50 ppm | 1.01 |
| 38 | AMP 4% (1) | No. ⑥ 13% (3.25) | 13% (0.76) | 50 ppm | 0.60 |
| 39 | AMP 1.5% (1) | No. ⑥ 8.5% (5.67) | 20% (2.00) | 50 ppm | 0.58 |
| Comparative Example | | | | | |
| 18 | HEDP 20% | — | — | 50 ppm | 10.0 |
| 19 | PBTC 20% | — | — | 50 ppm | 8.01 |
| 20 | PBTC 10% | No. ③ 10% | — | 50 ppm | 16.3 |
| 21 | PBTC 10% | — | 10% | 50 ppm | 16.5 |
| 22 | — | No. ① 10% | 10% | 50 ppm | 24.3 |
| 23 | HEDP 10% (1) | No. ② 2% (0.20) | 8% (0.67) | 50 ppm | 11.1 |
| 24 | HEDP 10% (1) | No. ④ 3% (0.30) | 7% (0.54) | 50 ppm | 10.8 |
| 25 | HEDP 10% (1) | No. ④ 8% (0.80) | 2% (0.11) | 50 ppm | 12.5 |
| 26 | PBTC 5% | *PAa 5% | 10% | 50 ppm | 15.1 |
| 27 | PBTC 5% | *PMa 5% | 10% | 50 ppm | 14.9 |

*PAa: sodium polyacrylate
*PMa: polymaleic acid
PBTC: 2-phosphonobutane-1,2,4-tricarboxylic acid
HEDP: 1-hydroxyethylidene-1,1-diphosphonic acid
AMP: aminotrimethylenephosphonic acid As can be understood from Table 6, the scale inhibitor of the invention exhibited a excellent scale-inhibiting effect even in the aqueous system having a high heat flux.

EXAMPLE 4

A scale deposition test was conducted in the same manner as Example 3. The type of water used in this test is detailed in the following Table 7.

TABLE 7

| pH | 8.3 |
|---|---|
| M-alkalinity | 300 ppm |
| Total hardness | 160 ppm |
| Ca hardness | 100 ppm |

Test conditions were as follows:
Temperature of the water: 50° C.
Flow rate of test water : 0.5m/sec
Test period : 120 hrs The result of the test is shown in FIG. 2 in which represented as "●" is data of the case using no scale inhibitor, as "○", data of the case using only HEDP (30 ppm as solid), as "☆", data of the case using only PBTC (30 ppm as solid), and as "△", data of the case using Example No. 14 (30 pm as solid) appeared in Table 6.

Figure 2:
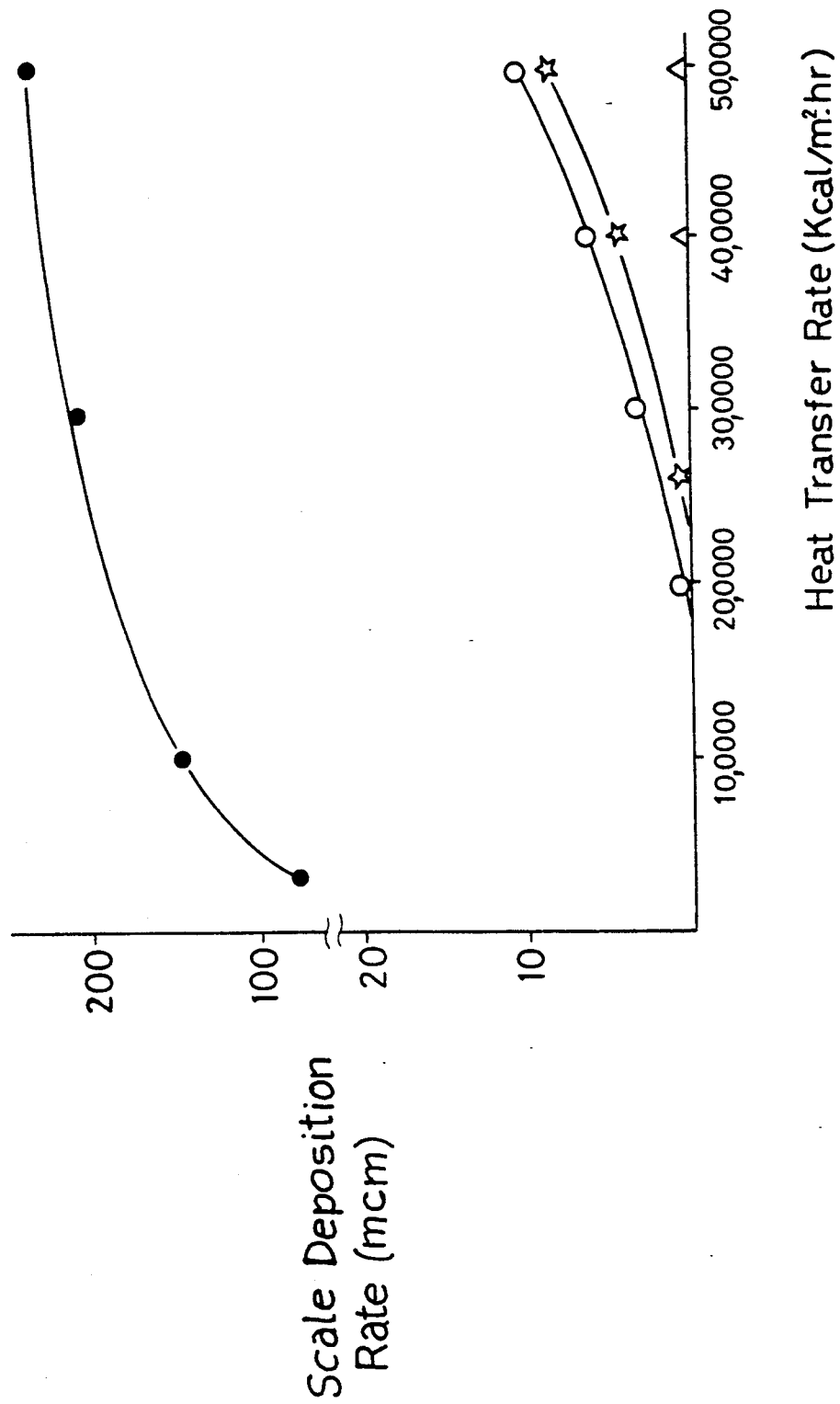

As can be understood from FIG. 2, HEDP or PBTC exhibited unsatisfactory scale-inhibiting effect in the aqueous system having a high heat flux of over 200,000 Kcal/m2.hr, while the scale inhibitor of the invention exhibited an excellent scale-inhibiting effect against calcium-type scale even in such a severe aqueous system.

As has been described, the scale inhibitor for calcium-type scale according to the invention can inhibit the occurrence of calcium-type scale even in a severe aqueous system such as to have a high calcium hardness or high heat flux. Accordingly, the scale inhibitor of the invention can prevent problems due to calcium-type scale in various aqueous systems.

It should be understood that the Examples as recited above are merely examples and not limitative of the invention.

What is claimed is:

1. An inhibitor of the formation of scale in an aqueous system, comprising;
   (a) an organophosphonic acid- or salt thereof having a scale inhibiting property, said organophosphonic acid being selected from the group consisting of 2-phosphonobutane-1,2,4-tricarboxylic acid, 1-hydroxyethylidene-1,1-diphosphonic acid and aminomethylenephosphonic acid;
   (b) a water soluble copolymer comprising:
      (1) at least two different vinyl monomers each having a carboxyl group represented by formula (I):

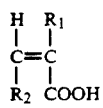

Formula (I)

where $R_1$ represents a hydrogen atom or a methyl group; $R_2$ represents a hydrogen atom, a methyl group, a second carboxyl group, or said second carboxyl group together with said carboxyl group forming a maleic acid anhydride ring; or
      (2) by at least a combination of the vinyl monomer (I) and a vinyl monomer having another polar group represented by the formula (II):

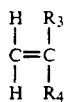

Formula (II)

where $R_3$ represents a hydrogen atom or a methyl group; $R_4$ represents —$COOR_5SO_3H$; —$COOR_5OH$, —$CONHR_5SO_3H$, —$CONHR_2OH$, —$R_5SO_3H$, —$C_6H_4$—$SO_3H$ or —$R_5O(R_6O)_nH$, wherein $R_5$ represents a $C_{1-4}$ alkylene group, $R_6$ represents a $C_{1-3}$ alkylene group, and n represents an integer between 0 to 100; wherein said carboxyl group containing monomer is contained in an amount of at least 30 mol % in said water-soluble copolymer; and wherein an average molecular weight of said water-soluble copolymer (b) is between about 500 to about 100,000; and
   (c) citric acid or a salt thereof;
wherein a blending ratio by weight of said water-soluble copolymer component (b) to said organophosphonic acid component (a) is 0.4–20:1, and a blending ratio of said citric acid component (c) to said water-soluble copolymer component (a) and said organophosphonic acid component (b) together is 0.3–3.0:1.

2. A scale inhibitor according to claim 1, wherein a blending ratio by weight of said water-soluble copolymer component (b) to said organophosphnic acid component (a) is 1.0–10.1.

3. A scale inhibitor according to claim 1, wherein a blending ratio by weight of said water-soluble copolymer component (b) to said organophosphonic acid component (a) is 1.0–3:1, and a blending ratio by weight of said citric acid component (c) to said water-soluble copolymer component (a) and said organophosphonic acid component (b) together is 0.5–2.0:1.

4. A scale inhibitor according to any one of claims 1, 2 and 3, wherein the water soluble copolymer (b) is selected from the group consisting of acrylic acid/sulfoethyl acrylate, acrylic acid/methallylsulfonic acid, acrylic acid/2-acrylamido-2-methylpropanesulfonic acid, acrylic acid/polyethyleneglycol monoallyl ether, acrylic acid/methacrylic acid, maleic acid/styrenesulfonic acid, acrylic acid/2-hydroxyethyl acrylate and methacrylic acid/N-methylolacrylamide.

5. A scale inhibitor according to any one of claims 1, 3 and 4, which is used in an aqueous system having a calcium hardness of over 300 ppm.

6. A scale inhibitor according to any one of claim 1, 3 and 4, which is used in a cooling aqueous system having a heat flux of over 300,000 Kcal/m².hr.